(12) United States Patent
Kang et al.

(10) Patent No.: US 9,077,528 B2
(45) Date of Patent: Jul. 7, 2015

(54) METHOD AND DEVICE FOR PERFORMING COMMUNICATION IN WIRELESS COMMUNICATION SYSTEM

(71) Applicant: Samsung Electronics Co., Ltd., Suwon-si, Gyeonggi-do (KR)

(72) Inventors: Noh-Gyoung Kang, Seoul (KR); Jae-Seung Son, Suwon-si (KR); Eun-Tae Won, Seoul (KR); Tae-Han Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/185,103

(22) Filed: Feb. 20, 2014

(65) Prior Publication Data

US 2014/0233536 A1    Aug. 21, 2014

(30) Foreign Application Priority Data

Feb. 20, 2013  (KR) ........................ 10-2013-0018057

(51) Int. Cl.
*H04L 5/14* (2006.01)
*H04W 72/12* (2009.01)

(52) U.S. Cl.
CPC ......... *H04L 5/1438* (2013.01); *H04W 72/1215* (2013.01)

(58) Field of Classification Search
USPC ................................................. 370/336, 337
See application file for complete search history.

(56) References Cited

U.S. PATENT DOCUMENTS

| | | | | |
|---|---|---|---|---|
| 7,715,352 | B2* | 5/2010 | Huang et al. | 370/338 |
| 8,472,426 | B2* | 6/2013 | Choi et al. | 370/345 |
| 8,503,343 | B2* | 8/2013 | Kawakami et al. | 370/311 |
| 8,571,003 | B2* | 10/2013 | Guo et al. | 370/347 |
| 2004/0131034 | A1* | 7/2004 | Sugaya | 370/337 |
| 2008/0044006 | A1* | 2/2008 | Kitagawa | 379/433.01 |
| 2009/0067389 | A1* | 3/2009 | Lee et al. | 370/336 |
| 2010/0118698 | A1* | 5/2010 | Yokobori et al. | 370/230 |
| 2010/0265923 | A1* | 10/2010 | Choi et al. | 370/336 |
| 2010/0278087 | A1* | 11/2010 | Kawakami et al. | 370/311 |
| 2011/0092164 | A1* | 4/2011 | Spanhake | 455/67.11 |
| 2011/0110291 | A1* | 5/2011 | Ishii | 370/315 |
| 2011/0158206 | A1* | 6/2011 | Shrestha et al. | 370/336 |
| 2012/0039275 | A1* | 2/2012 | Chen et al. | 370/329 |

FOREIGN PATENT DOCUMENTS

KR    10-0653368 B1    11/2006

\* cited by examiner

*Primary Examiner* — Orgad Edan
*Assistant Examiner* — Emmanuel Maglo
(74) *Attorney, Agent, or Firm* — Jefferson IP Law, LLP (57) ABSTRACT

A method and a device for performing communication in a wireless communication system are provided. In the wireless communication system, a transmitter determines a communication state for first devices using a first communication scheme for a first time interval, determines a duration of a second time interval to be allocated for the first devices, and transmits information on the second time interval having the determined duration to the first devices before the second time interval starts, wherein the first time interval and the second time interval are included in a frame allocated for a second communication scheme that different from the first communication scheme, wherein a frequency used for the first communication scheme is identical to a frequency used for the second communication scheme, and wherein a signal transmission operation of second devices using the second communication scheme is suspended during the first time interval and the second time interval.

24 Claims, 7 Drawing Sheets

METHOD AND DEVICE FOR PERFORMING COMMUNICATION IN WIRELESS COMMUNICATION SYSTEM

CROSS-REFERENCE TO RELATED APPLICATION(S)

This application claims the benefit under 35 U.S.C. §119 (a) of a Korean patent application filed on Feb. 20, 2013 in the Korean Intellectual Property Office and assigned Serial number 10-2013-0018057, the entire disclosure of which is hereby incorporated by reference.

TECHNICAL FIELD

The present disclosure relates to a method and a device for performing communication in a wireless communication system.

BACKGROUND

In general, a Wireless Local Area Network (WLAN), which may be referred to as Wireless Fidelity (Wi-Fi), is a technology referring to a Local Area Network (LAN) through which access to the wireless internet can be made within a distance from a place where an Access Point (AP) is installed, by using an electric wave, such as a Radio Frequency (RF) signal, an infrared transmission, or any other similar and/or suitable method based on an Institute of Electrical and Electronics Engineers (IEEE) 802.11 technology. The Wi-Fi changes a wired LAN transmission method to be suitable for a wireless environment and provides the same to a wireless network environment, thereby providing mobility to a user of a mobile station and reducing an installation cost of the LAN.

Meanwhile, ZigBee, one of technologies supporting a Wireless Personal Area Network (WPAN), is a sensor network technology based on IEEE 802.15.4. The ZigBee has been optimized for networking having a small amount of data transmission, a small amount of power consumption, and security. Home automation, ZigBee smart energy, building automation, and health care are fields to which the ZigBee is applied. Further, as a small scale network system, such as a home network, or a ubiquitous environment develops, the ZigBee optimized for the small scale network using small power is increasingly used.

Usable frequency bands for Wi-Fi communication and ZigBee communication, respectively, are differentiated into a plurality of usable frequency bands. Among the plurality of usable frequency bands, a usable frequency band of 2.4 GHz is an Industrial, Scientific, and Medical (ISM) band commonly used around the world, and may be commonly used for the Wi-Fi communication and the ZigBee communication.

Figure 1A:
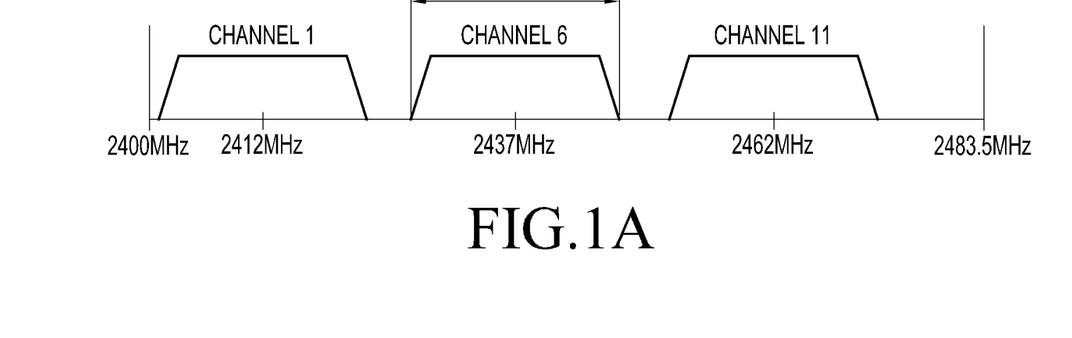
FIG. 1A illustrates an example of a general channel structure for Wireless Fidelity (Wi-Fi) communication in a usable frequency band of 2.4 GHz according to related art.

FIG. 1A illustrates an example of a general channel structure for Wi-Fi communication in a usable frequency band of 2.4 GHz according to related art.

Referring to FIG. 1A, an entire usable frequency band of the Wi-Fi is from 2400 MHz to 2483.5 MHZ, a channel bandwidth of the Wi-Fi is 22 MHz, and an interval between Wi-Fi channels may be set to 5 MHz. In this case, a total of three channels, including channels 1, 6, and 11, may be used for the Wi-Fi communication in the entire usable frequency band.

Figure 1B:
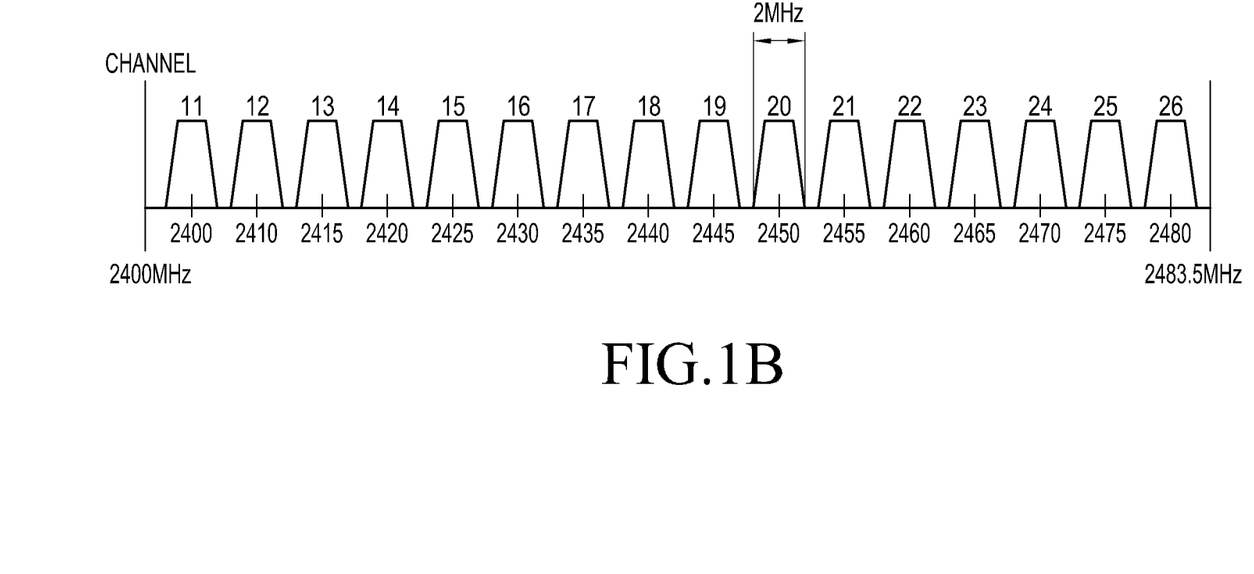
FIG. 1B illustrates an example of a general channel structure for ZigBee communication in a usable frequency band of 2.4 GHz according to related art.

FIG. 1B illustrates an example of a general channel structure for ZigBee communication in a usable frequency band of 2.4 GHz according to related art.

Referring to FIG. 1B, an entire usable frequency band for the ZigBee communication is from 2400 MHz to 2483.5 MHZ, which is the same as the entire usable frequency band for the Wi-Fi communication. A channel bandwidth for the ZigBee communication may be 2 MHz, which is smaller than the channel bandwidth for the Wi-Fi communication. In this case, a total of sixteen channels, including channels 11 to 26, may be used for the ZigBee communication in the entire usable frequency band.

When the same usable frequency band is used for the Wi-Fi communication and the ZigBee communication, as described above, the Wi-Fi channels and the ZigBee channels overlap each other. Thus, a collision within the channels may occur between devices using the Wi-Fi communication and devices using the ZigBee communication. A Carrier Sense Multiple Access/Collision Avoidance (CSMA/CA) technology is used to prevent such a collision problem.

Figure 2:
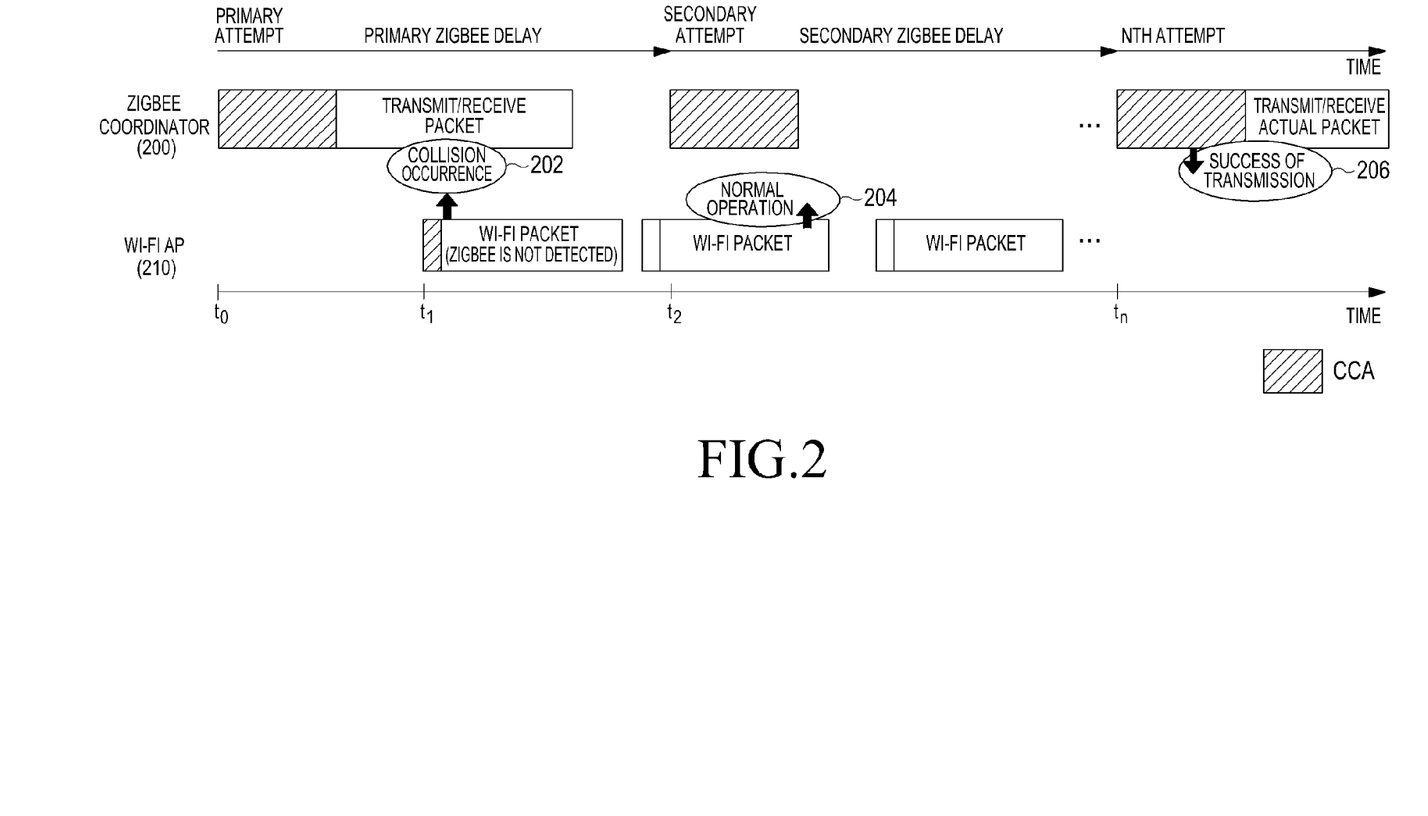
FIG. 2 illustrates a process of using a Carrier Sense Multiple Access/Collision Avoidance (CSMA/CA) technology when Wi-Fi communication and ZigBee communication are simultaneously used in a same frequency band according to related art.

FIG. 2 illustrates a process of using a CSMA/CA technology when Wi-Fi communication and ZigBee communication are simultaneously used in a same frequency band according to related art.

Referring to FIG. 2, when a ZigBee coordinator 200 and a Wi-Fi AP 210 respectively detect a device to perform ZigBee communication and a device to perform Wi-Fi communication, they perform a coordination operation for making the corresponding communication.

Specifically, the ZigBee coordinator 200 detects, at a time point of $t_0$, that ZigBee communication from a first device is initiated. Then, the ZigBee coordinator 200 performs a Channel Clear Assessment (CCA) operation for determining whether there is another device using a channel at the time point of $t_0$. When the other device is not detected as a result of the CCA operation, then the ZigBee coordinator 200 performs packet transmission and/or reception with the first device.

Meanwhile, Wi-Fi communication may be initiated by a second device at a time point of $t_1$, which is within a time interval in which the packet transmission and/or reception is performed between the ZigBee coordinator 200 and the first device. At this time, the Wi-Fi AP 210 also performs the CCA operation for identifying whether there is another device using the channel.

However, since a transmission output of the ZigBee communication is generally very small relative to a transmission output of the Wi-Fi communication, the Wi-Fi AP 210 does not recognize that the packet transmission and/or reception of the ZigBee communication is performed at the time point of $t_1$. Thus, the Wi-Fi AP 210 determines that the channel is to be used, and starts communication with the second device. Accordingly, a collision 202, according to simultaneous performance of the ZigBee communication and the Wi-Fi communication, occurs in the packet transmission and/or reception interval of the ZigBee communication. The packet transmission and/or reception of the ZigBee communication fails due to the collision so that a first delay of the ZigBee communication occurs.

When a predetermined period of time elapses after the first delay, the ZigBee coordinator 200 performs a second CCA operation at a time point of $t_2$ in order to perform transmission and/or reception of the packet again. In this case, when the ZigBee coordinator 200 recognizes that the channel is being used for the Wi-Fi communication, the ZigBee communication may not be performed, and thus, a second delay of the ZigBee communication occurs. On the other hand, a normal operation 204 is performed for the Wi-Fi communication.

The ZigBee coordinator 200 periodically repeats the CCA operation. When it is determined, as a result of a CCA operation performed at a time point of $t_n$, that the channel is to be used, then the ZigBee coordinator 200 performs the packet transmission and/or reception operation through the ZigBee communication so that success of transmission 206, according to the ZigBee communication, may be achieved.

When the ZigBee communication and the Wi-Fi communication are performed in the same frequency band as described above, the Zig-Bee communication having a relatively low transmission output is generally delayed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for performing communication in a wireless communication system.

Another aspect of the present disclosure is to provide a method and a device for enabling Wireless Fidelity (Wi-Fi) communication and ZigBee communication to be used together in a same frequency band.

Another aspect of the present disclosure is to provide a method and a device, in which a Wi-Fi Access Point (AP) controls communication of ZigBee devices according to a Wi-Fi frame containing a period for ZigBee communication.

In accordance with an aspect of the present disclosure, a method of performing communication by a transmitter in a wireless communication system is provided. The method includes determining a communication state for first devices using a first communication scheme during a first time interval, determining a duration of a second time interval to be allocated for the first devices according to the communication state, and transmitting information on the second time interval having the determined duration to the first devices before the second time interval starts, wherein the first time interval and the second time interval are included in a frame allocated for a second communication scheme that is different from the first communication scheme, wherein a frequency used for the first communication scheme is identical to a frequency used for the second communication scheme, and wherein a signal transmission operation of second devices using the second communication scheme is suspended during the first time interval and the second time interval.

In accordance with another aspect of the present disclosure, a method of performing communication by a receiver in a wireless communication system is provided. The method includes performing communication by using a first communication scheme during a first time interval, receiving, from a transmitter, information on a second time interval having a duration determined according to a communication state during the first time interval, and performing communication by using the first communication scheme during the second time interval according to the received information on the second time interval, wherein the first time interval and the second time interval are included in a frame allocated for a second communication scheme that is different from the first communication scheme, wherein a frequency used for the first communication scheme is identical to a frequency used for the second communication scheme, and wherein a signal transmission operation of second devices using the second communication scheme is suspended during the first time interval and the second time interval.

In accordance with another aspect of the present disclosure, a transmitter in a wireless communication system is provided. The transmitter includes a controller configured to determine a communication state for first devices using a first communication scheme during a first time interval, and to determine a duration of a second time interval to be allocated for the first devices according to the communication state, and a communication unit configured to transmit information on the second time interval having the determined duration to the first devices before the second time interval starts, wherein the first time interval and the second time interval are contained in a frame allocated for a second communication scheme that is different from the first communication scheme, wherein a frequency used for the first communication scheme is identical to a frequency used for the second communication scheme, and wherein a signal transmission operation of second devices using the second communication scheme is suspended during the first time interval and the second time interval.

In accordance with another aspect of the present disclosure, a receiver in a wireless communication system is provided. The receiver includes a communication unit configured to perform communication by using a first communication scheme during a first time interval and to receive, from a transmitter, information on a second time interval having a duration determined according to a communication state during the first time interval, and a controller configured to perform communication by using the first communication scheme during the second time interval the received information, wherein the first time interval and the second time interval are included in a frame allocated for a second communication scheme that is different from the first communication scheme, wherein a frequency used for the first communication scheme is identical to a frequency used for the second communication scheme, and wherein a signal transmission operation of second devices using the second communication scheme is suspended during the first time interval and the second time interval.

As described above, according to various embodiments of the present disclosure, both ZigBee communication and Wi-Fi communication which use the same frequency band can be used based on a Wi-Fi frame containing a period for the ZigBee communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3:
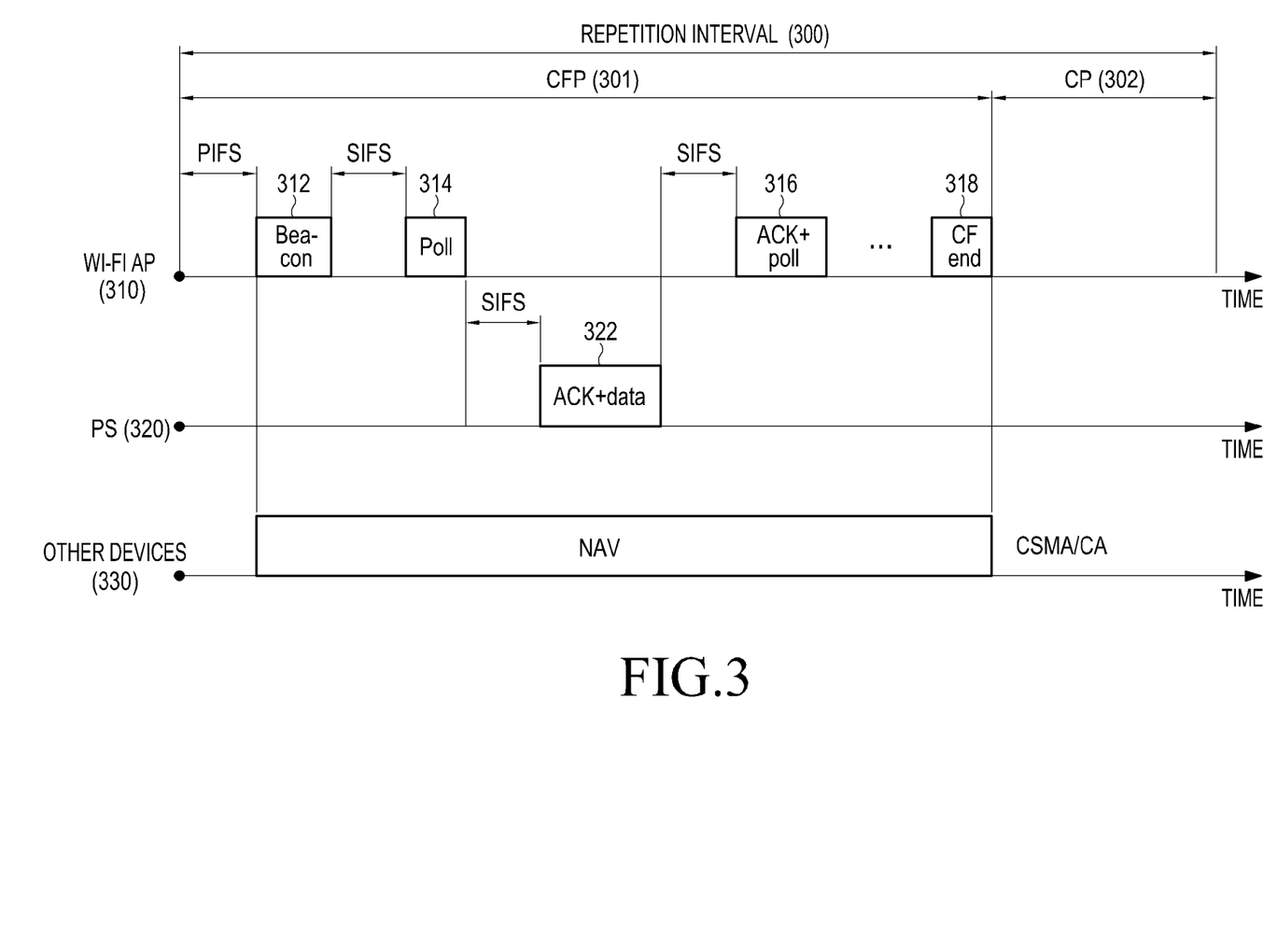
FIG. 3 illustrates a structure of a general Wi-Fi frame according to an embodiment of the present disclosure.

FIG. 3 illustrates a general structure of a Wireless Fidelity (Wi-Fi) frame according to an embodiment of the present disclosure.

Referring to FIG. 3, the Wi-Fi frame includes a repetition interval 300. The repetition interval 300 includes a Contention Free Period (CFP) 301, in which communication may be made without a collision between devices and a Contention Period (CP) 302, in which communication is performed through contention between devices.

The CFP 301 is a period in which a point coordinator, implemented within a Wi-Fi Access Point (AP) 310, performs polling on devices based on a Point Coordination Function (PCF). Namely, in the CFP 301, only devices paged by the Wi-Fi AP 310 may perform communication, and devices that are not paged are maintained in a standby state.

In the CFP 301, the Wi-Fi AP 310 determines whether a wireless channel is being used by another device. When the wireless channel is not being used, the Wi-Fi AP 310 stands by in a PCF InterFrame Space (PIFS) period and then, transmits a beacon to Wi-Fi devices in a Beacon period 312. Other devices 330, having received the beacon in the Beacon period 312, temporarily suspend a communication request and signal transmission for the Wi-Fi AP 310 and are set to be in a Network Allocation Vector (NAV) state of performing a standby operation.

Meanwhile, when the Beacon period 312 is completed, the Wi-Fi AP 310 transmits a poll signal to a Polled Station (PS) 320, which is a device to poll, in a Poll period 314 subsequent to a Short InterFrame Space (SIFS). For reference, in the CFP 301, if one signal is transmitted, an operation of transmitting a next signal is performed after a time interval corresponding to the SIFS.

The PS 320 receives the poll signal of the Wi-Fi AP 310 transmitted in the Poll period 314, and transmits an Acknowledgement (ACK) and data, which are responses to the reception of the poll signal, to the Wi-Fi AP 310 in an ACK+data period 322, subsequent to a SIFS period. Thereafter, when the ACK+data period 322 is completed, the Wi-Fi AP 310 transmits a poll signal in order to transmit, to another PS, and an ACK, which is the response to the data received from the PS 320, to the PS 320 in an ACK+Poll period 316 subsequent to a SIFS. When there are no more devices subject to polling, the Wi-Fi AP 310 informs of completion of the CFP 301 by transmitting a Contention Free (CF) end signal for notifying of the completion of the CFP 301 to all devices within a Wi-Fi area in a CF end period 318. Then, the other devices 330 having received the CF end signal are released from the NAV state.

When the CFP 301 is completed, the CP 302 is initiated. The CP 302 is a period in which control is performed by a Distributed Coordination Function (DCF) of the Wi-Fi AP 310, and a collision between several devices simultaneously approaching, or in other words, simultaneously attempting to transmit via, the wireless channel is prevented through a Carrier Sense Multiple Access/Collision Avoidance (CSMA/CA) scheme in the CP 302. When the CSMA/CA scheme is applied, each device, prior to transmission, determines whether the wireless channel is empty, or in other words, available. When a collision between the devices is predicted as a result of the determination, some of the corresponding devices delay communication, or in other words, back off from transmitting, in order to prevent the collision between the devices.

When the Wi-Fi frame, configured as illustrated in FIG. 3, is used, then the Wi-Fi AP 310 designates a device that will perform communication as the PS 320, i.e., as a device subject to polling, in the CFP 310, and the remaining devices, except for the PS 320, are set as the NAV state. Here, the Wi-Fi AP 310 does not consider ZigBee devices when designating the device which will perform the communication as the PS 320.

Accordingly, communication between the ZigBee devices is continuously delayed in a period in which communication is performed while a specific Wi-Fi device is designated as a PS. Further, in the CP 302, the Wi-Fi AP 310 detects a presence or absence of a device being used on the wireless channel in order to prevent the collision between the devices. However, ZigBee transmission power is relatively too small to be detected, or in other words, recognized, by the Wi-Fi AP 310 and thus, it may be difficult for the Wi-Fi AP 310 to recognize the ZigBee devices. Thus, a communication scheme which considers ZigBee communication unilaterally neglected in a situation wherein the Wi-Fi devices and the ZigBee devices use the same frequency band is needed.

In general, in a case where Wi-Fi devices and ZigBee devices coexist in a common frequency band, a transmission time, as well as an amount of transmission, of Wi-Fi communication is large as compared with ZigBee communication. Accordingly, a new frame structure containing a period for the ZigBee communication within a Wi-Fi frame structure is proposed according to an embodiment of the present disclosure. Further, a scheme in which the Wi-Fi AP controls the ZigBee communication based on the new frame structure is proposed according to embodiment of the present disclosure.

Figure 4:
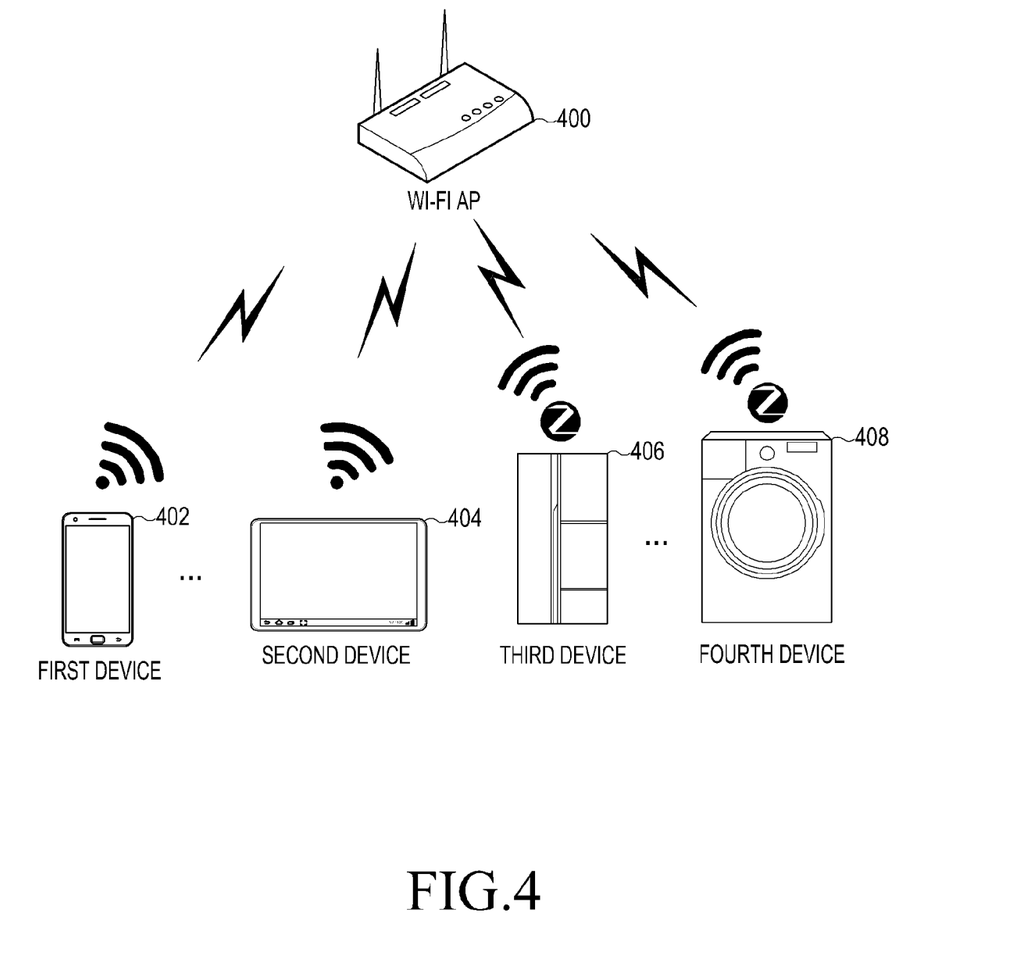
FIG. 4 illustrates a configuration of a wireless communication system according to an embodiment of the present disclosure.

FIG. 4 illustrates a configuration of a wireless communication system according to an embodiment of the present disclosure.

Referring to FIG. 4, the wireless communication system includes a Wi-Fi AP 400 and a plurality of devices. The plurality of devices include Wi-Fi devices, such as a first device 402 and a second device 404, that perform Wi-Fi communication, and ZigBee devices, such as a third device 406 and a fourth device 408, that perform ZigBee communication.

Here, the Wi-Fi devices may be a smart phone, a tablet Personal Computer (PC), a smart Television (TV), and any other similar and/or suitable devices which include a Wi-Fi communication unit and a controller that controls an operation for the Wi-Fi communication, and the ZigBee devices may be home appliances, e.g., a refrigerator, a washing machine, a light, and any other similar and/or suitable devices which include a ZigBee sensor, such as a ZigBee communication unit, and a controller that controls an operation for the ZigBee communication. The ZigBee devices, that is, the third device 406 and the fourth device 408, are located within an area managed by the Wi-Fi AP 400 and may be controlled by the Wi-Fi AP 400.

The Wi-Fi AP 400 controls the Wi-Fi communication and the ZigBee communication based on a frame structure in which periods for the Wi-Fi communication and the ZigBee communication are differentially set. In particular, a frame used by the Wi-Fi AP 400 has a structure in which the ZigBee devices are considered as a poll target in preference to the Wi-Fi devices in the CFP of the existing Wi-Fi frame.

Hereinafter, a frame structure according to an embodiment of the present disclosure will be described in detail with reference to FIG. 5.

Figure 5:
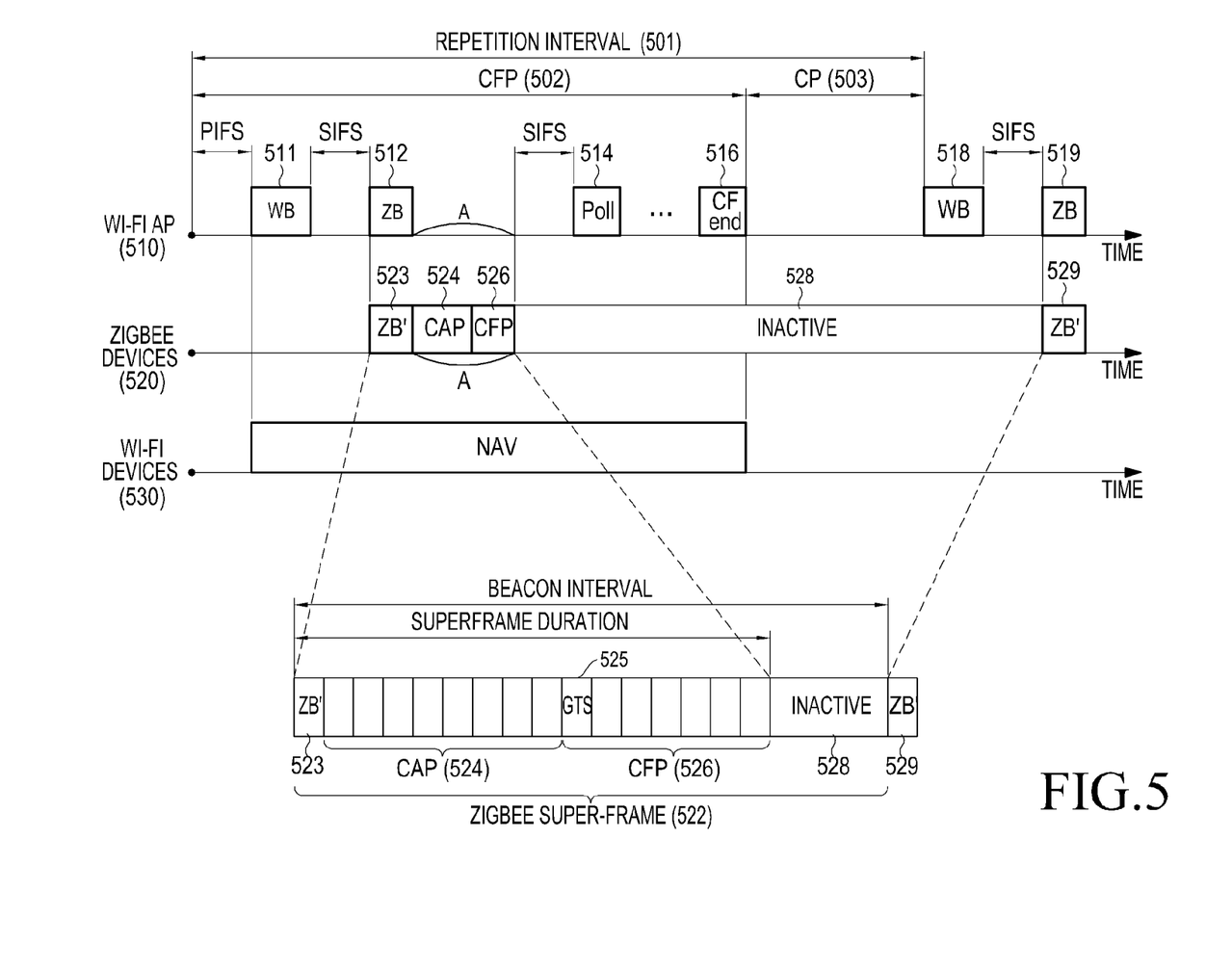
FIG. 5 illustrates a frame structure according to an embodiment of the present disclosure.

FIG. 5 illustrates a frame structure according to an embodiment of the present disclosure.

Referring to FIG. 5, the frame structure of a frame, according to an embodiment of the present disclosure, includes a repetition interval 501 containing a CFP 502 and a CP 503. The CFP 502 includes a Wi-Fi Beacon (WB) period 511, in which a beacon, hereinafter, referred to as a Wi-Fi beacon (WB), targeting Wi-Fi devices 530 is transmitted, and a ZigBee Beacon (ZB) ZB period 512 in which a beacon, hereinafter, referred to as a ZigBee beacon (ZB), targeting ZigBee devices 520 is transmitted.

When a Wi-Fi AP 510 transmits the WB in the WB period 511, the Wi-Fi devices 530 receive the WB and transit to, or in other words enter, a NAV state. In the NAV state, the Wi-Fi devices 530 may not transmit a signal and a service request to the Wi-Fi AP 510, but do perform a standby operation in order to receive a WB and a signal transmitted by the Wi-Fi AP 510.

The ZB period 512 is a period in which the ZigBee devices 520 are considered as polling target devices in preference to the Wi-Fi devices 530, and as the CFP 502 is periodically repeated, the ZB period 512 is also periodically repeated. A ZigBee communication period A, subsequent to the ZB period 512, represents a period in which communication for the ZigBee devices 520 is performed for a preset period of time.

Hereinafter, an operation of the Wi-Fi AP 510, the ZigBee devices 520, and the Wi-Fi devices 530, based on the aforementioned frame will be described.

First, the Wi-Fi AP 510 determines, in a PIFS, whether the Wi-Fi devices 530 exist. The Wi-Fi AP 510 transmits a WB, targeting the Wi-Fi devices 530 located within a service area thereof, in the WB period 511 subsequent to the PIFS. Here, the Wi-Fi devices 530 having received the WB are set to be in a NAV state from a start time point of the WB period 511 to an end time point of a CFP end period 516.

The Wi-Fi AP 510 transmits a ZB, targeting the ZigBee devices 520, in the ZB period 512 subsequent to a SIFS following the WB period 511. Then, the ZigBee devices 520 receive the ZB in a ZB' period 523, and attempt access to the Wi-Fi AP 510 serving as a ZigBee coordinator in a Contention Access Period (CAP) 524. Namely, the ZigBee devices 520 transmit a response signal, in response to the ZB received from the Wi-Fi AP 510, in the CAP 524 in order to request the access to the Wi-Fi AP 510.

When the response signal to the ZB is not received in the CAP 524, then the Wi-Fi AP 510 determines that the ZigBee devices 520 do not exist within the service area thereof. For an improvement of Wi-Fi communication efficiency and energy saving, the Wi-Fi AP 510 operates as a general Wi-Fi AP for Wi-Fi communication until a ZB period 519, which is contained in a CFP period of a next repetition interval subsequent to the repetition interval 501, starts.

When the response signal in response to the ZB is received in the CAP 524, the Wi-Fi AP 510 determines that the ZigBee devices exist within the service area thereof. The Wi-Fi AP 510 operates the ZigBee communication period A for ZigBee communication using the ZigBee devices 520. A time period including the ZB period 512 and the ZigBee communication period A may be referred to as a ZigBee super-frame 522.

The ZigBee super-frame 522 includes a super-frame duration containing the ZB' period 523, in which the ZigBee devices 520 receive the ZB transmitted in the ZB period 512, the CAP 524, a CFP 526, and an inactive period 528. In the frame structure shown in FIG. 5, the ZB period 512 is repeated according to a beacon interval per the repetition interval 501. Here, since the ZB' period 523 is a period corresponding to the ZB period 512, the ZB' period 523 is repeated similarly to the ZB period 512 according to the beacon interval.

The ZigBee communication period, including the CAP 524 and the CFP 526, continues for the super-frame duration. The super-frame duration 522 may be a duration including slots, for example, sixteen slots, and a first slot among the slots included in the duration is allocated to the ZB' period 523. The ZigBee devices 520 may determine, based on the ZB received in the ZB' period 523, that the CAP 524 and the CFP 526 are initiated after the ZB' period 523.

In the CAP 524, variable slot allocation may be made according to demands of a network device, and communication is performed for the ZigBee devices having acquired a communication opportunity through the CSMA/CA scheme. Even in the CFP 526, the variable slot allocation may be made according to needs of the network device, and communication is performed for specific ZigBee devices paged by the Wi-Fi AP 510. Here, the CFP 526 may include a Guaranteed Time Slot (GTS) period 525, and one instance of the GTS period 525 included in the CFP 526 is illustrated as an example in FIG. 5. The GTS period 525 is allocated such that a ZigBee device that should perform communication in a specific time interval may perform the communication in the corresponding time interval.

Meanwhile, the inactive period 528, initiated after completion of the super-frame duration 522, represents a period in which the ZigBee communication is not performed. The Wi-Fi AP 510 sets the super-frame duration based on an amount of the ZigBee communication, and the inactive period 528 is set as the remaining duration except for the set super-frame duration. For example, when it is determined that there are a large amount of the ZigBee communication to be performed, the Wi-Fi AP 510 may set the super-frame duration to be long enough to have greater than a preset number of slots, and the inactive period 528 is accordingly shortened.

For the inactive period 528, the Wi-Fi AP 510 performs Wi-Fi communication with the Wi-Fi devices 530. Specifically, when the inactive period 528 is initiated, the Wi-Fi AP 510 performs a general polling operation on the Wi-Fi devices 530, after an SIFS, from a start time point of the inactive period 528. The polling operation between the Wi-Fi AP 510 and the Wi-Fi devices 530 in a time interval containing a poll period 514 is similar to that illustrated in FIG. 3 and thus, a detailed description thereof will be omitted.

Meanwhile, when an end time point of the CFP 502 comes, the Wi-Fi AP 510 transmits a CF end signal, for informing that the CFP 502 is completed in the CF end period 516, to the Wi-Fi devices 530 that are set to be in the NAV state. Then, the Wi-Fi devices 530 having received the CF end signal are released from the NAV state.

All devices within a corresponding frequency band acquire a communication opportunity through contention in the CP 503 subsequent to the CFP 502. An operation of the Wi-Fi AP 510 in the CP 503 is similar to that of the Wi-Fi AP 310 in the CP 302 illustrated in FIG. 3 and thus, a detailed description thereof will be omitted.

When the CP 503 is completed, the repetition interval 501 is repeated again, and corresponding operations of the Wi-Fi AP 510 are also repeated. For example, in a new repetition frame structure, the Wi-Fi AP 510 transmits a WB targeting the Wi-Fi devices 530 in a WB period 518, and transmits a ZB targeting the ZigBee devices 520 in a ZB period 519 subsequent to a SIFS.

Further, a ZB' period 529, corresponding to the ZB period 519, is initiated after the beacon interval from the ZB' period 523. Since the ZB' period 529 is similar to the ZB' period 523, a detailed description thereof will be omitted.

Meanwhile, the ZigBee communication period A, according to an embodiment of the present disclosure, may be variably used. Namely, the Wi-Fi AP 510 may change a duration of a ZigBee communication period B (not shown), that will be allocated to the next repetition interval, based on a communication state for the ZigBee devices 520 in the repetition interval 501. The communication state for the ZigBee devices 520 may be determined based on at least one of whether an amount of data transmitted and/or received for the ZigBee devices 520 is greater than or equal to a threshold value, and the number of data transmission and/or reception failures for the ZigBee devices 520. For example, when the amount of data transmitted and/or received for the ZigBee devices 520 is greater than or equal to the threshold value, and/or when the number of the data transmission and/or reception failures for the ZigBee devices 520 is a preset number or more, the Wi-Fi AP 510 increases the duration of the ZigBee communication period B which will be allocated to the next repetition interval.

On the other hand, when the amount of data transmitted and/or received for the ZigBee devices 520 is less than the threshold value, and/or when the number of the data transmission and/or reception failures for the ZigBee devices 520 is smaller than the preset number, the Wi-Fi AP 510 decreases the duration of the ZigBee communication period B.

The information on the ZigBee communication period B being changed as described above may be transmitted while being included within the ZB transmitted in the ZB period 519 of the next repetition interval, and/or may be included in system information containing information for using the ZigBee communication.

When the duration of the ZigBee communication period is shortened, a duration of the inactive period 528 is lengthened so that the amount of communication for the Wi-Fi devices 530 may be increased and a more flexible communication environment may be made without resource waste. Further, according to an embodiment of the present disclosure, the frame structure illustrated in FIG. 5 may be changed and used in various forms. For example, the Wi-Fi AP 510 may allow the ZigBee devices 520 to have different ZigBee communication periods according to communication states of the respective ZigBee devices 520.

Figure 6:
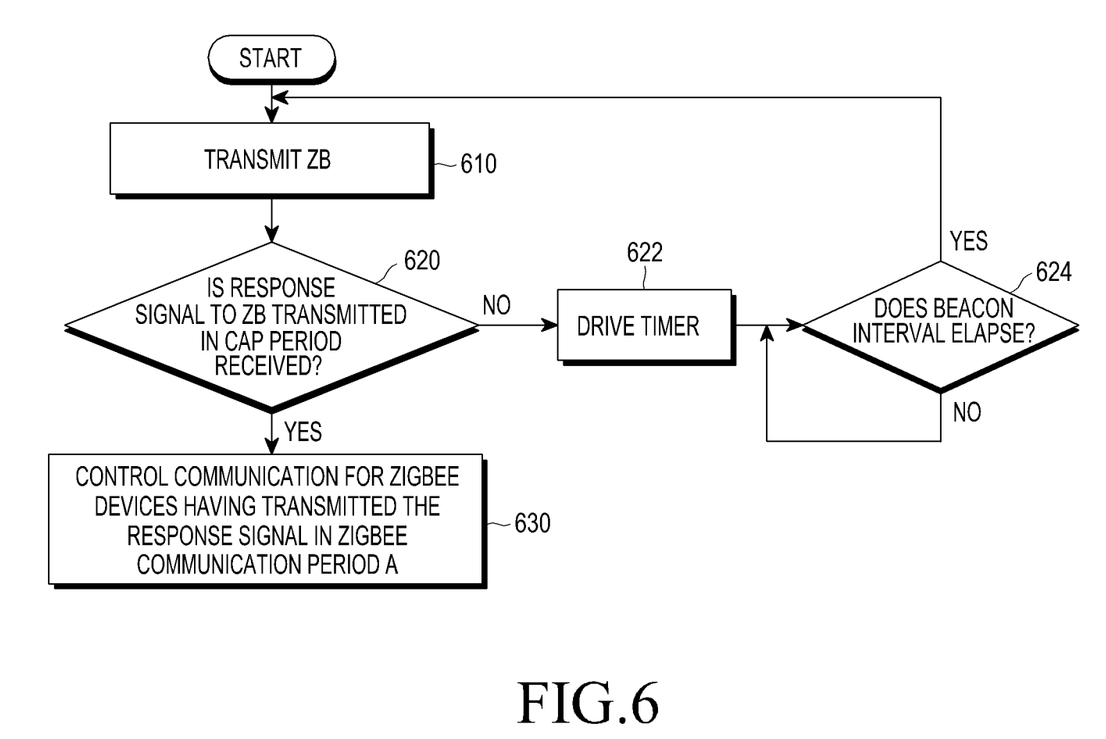
FIG. 6 is a flowchart illustrating a process of controlling ZigBee communication by a Wi-Fi AP according to an embodiment of the present disclosure.

FIG. 6 is a flowchart illustrating a process of controlling ZigBee communication by a Wi-Fi AP according to an embodiment of the present disclosure.

Referring to FIG. 6, a process is illustrated for controlling communication for ZigBee devices according to the frame structure illustrated in FIG. 5, by the Wi-Fi AP 510.

Referring to FIG. 6, in operation 610, the Wi-Fi AP 510 transmits a ZB targeting the ZigBee devices 520 in the ZB period 512. In operation 620, the Wi-Fi AP 510 determines whether a response signal to the ZB transmitted in the CAP period 524 is received.

When the response signal to the transmitted ZB is not received, the Wi-Fi AP 510 drives a timer corresponding to a ZB transmission interval in operation 622 and proceeds to operation 624. The ZB transmission interval represents a beacon interval for the ZB. In operation 624, the Wi-Fi AP 510 determines whether the beacon interval has elapsed by determining whether a driving time of the timer is expired.

When the beacon interval does not elapse, the Wi-Fi AP 510 stands by until the driving time of the timer is expired so that the beacon interval elapses. When the beacon interval elapses, the Wi-Fi AP 510 returns to operation 610 and transmits a ZB targeting the ZigBee devices 520.

When it is determined in operation 620 that the response signal to the transmitted ZB has been received, the Wi-Fi AP 510 controls communication for the ZigBee devices having transmitted the response signal in the ZigBee communication period A of the CFP 502, in operation 630. An operation of controlling the ZigBee communication of the Wi-Fi AP 510 has been described in relation to the ZigBee communication period A, as illustrated in FIG. 5 and thus, a detailed description thereof will be omitted.

Figure 7:
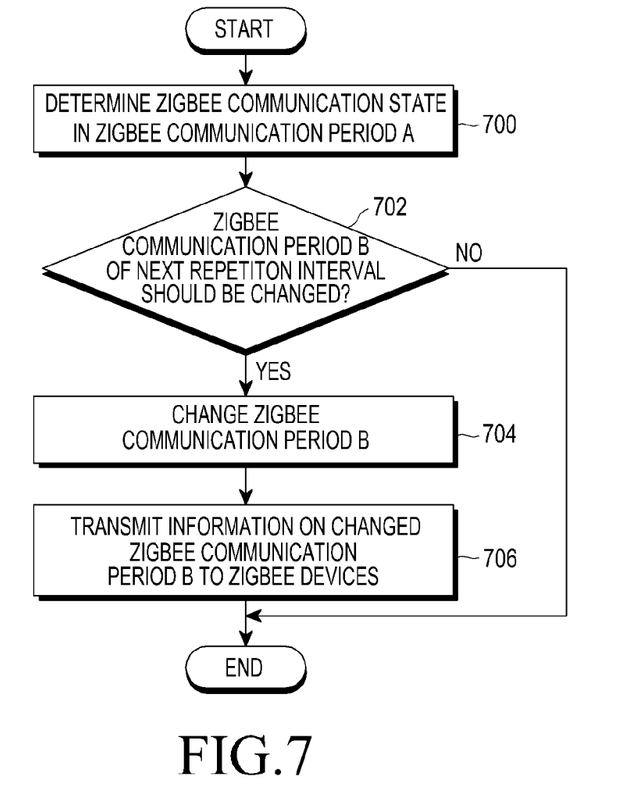
FIG. 7 is a flowchart illustrating a process of variably operating a ZigBee communication period by a Wi-Fi Access Point (AP) according to an embodiment of the present disclosure.

FIG. 7 is a flowchart illustrating a process of variably operating a ZigBee communication period by a Wi-Fi AP according to an embodiment of the present disclosure.

Referring to FIG. 7, the Wi-Fi AP 510 determines a state of ZigBee communication in the ZigBee communication period A of the repetition interval 510, in operation 700. For example, the Wi-Fi AP 510 determines the state of the ZigBee communication based on at least one of whether an amount of data transmitted and/or received for the ZigBee devices 520 in the ZigBee communication period A is greater than or equal to a threshold value, and the number of data transmission and/or reception failures for the ZigBee devices 520 in the ZigBee communication period A.

In operation 702, the Wi-Fi AP 510 determines, based on the determined communication state, whether a duration of the ZigBee communication period B in the next repetition interval should be changed. The Wi-Fi AP 510 terminates all processes when the communication state has not been changed, as determined according to operation 700. When it is determined that the communication state has been changed, according to the determination of operation 700, then the Wi-Fi AP 510 determines that the duration of the ZigBee communication period B should be changed, and changes the duration of the ZigBee communication period B in operation 704.

For example, the Wi-Fi AP 510 increases the duration of the ZigBee communication period B when the amount of data transmitted and/or received for the ZigBee devices 520 in the ZigBee communication period A is greater than or equal to the threshold value, and the number of data transmission and/or reception failures for the ZigBee devices 520 in the ZigBee communication period A is a preset number or more.

On the other hand, the Wi-Fi AP 510 decreases the duration of the ZigBee communication period B when the amount of data transmitted and/or received for the ZigBee devices 520 in the ZigBee communication period A is less than the threshold value, and the number of data transmission and/or reception failures for the ZigBee devices 520 in the ZigBee communication period A is smaller than the preset number.

In operation 706, the Wi-Fi AP 510 transmits information on the changed ZigBee communication period B, having the changed duration, in a ZB or in system information, and transmits the same to the ZigBee devices 520 in the ZB period 519 of the next repetition interval.

Figure 8:
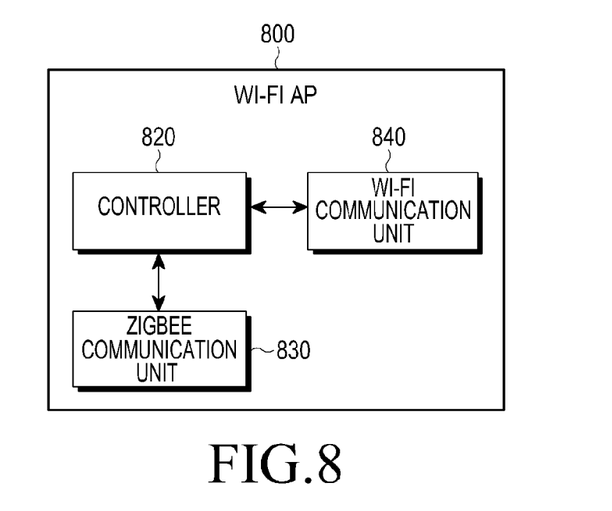
FIG. 8 is a block diagram illustrating a Wi-Fi AP according to an embodiment of the present disclosure.

FIG. 8 is a block diagram illustrating a Wi-Fi AP according to an embodiment of the present disclosure.

Referring to FIG. 8, the Wi-Fi AP 800 includes a controller 820, a ZigBee communication unit 830 and a Wi-Fi communication unit 840.

The controller 820 performs operations according to the frame structure of FIG. 5, and controls the ZigBee communication unit 830 and the Wi-Fi communication unit 840. For example, when a CFP 502 is initiated, the controller 820 determines whether there are Wi-Fi devices in a current frequency band. To this end, the controller 820 controls the Wi-Fi communication unit 840 to periodically transmit a WB in a WB period 511. Then, the Wi-Fi devices having received the WB operate in an NAV state for a preset period of time.

The controller 820 controls the ZigBee communication unit 830 to transmit a ZB in a ZB period of a CFP. At this time, the controller 820 determines whether a response signal to the transmitted ZB has been received through the ZigBee communication unit 830, and controls an operation of the ZigBee communication unit 830 for control of the ZigBee communication according to the identified result. Specifically, when the response signal has been received through the ZigBee communication unit 830, the controller 820 controls the ZigBee communication for the ZigBee devices having transmitted the response signal. Here, the ZigBee devices perform communication in a ZigBee communication period A set within a CFP.

When the response signal is not received through the ZigBee communication unit 830, then the controller 820 drives a timer corresponding to a ZB transmission interval, i.e., a beacon interval. Thereafter, the controller 820 controls the Wi-Fi communication unit 840 to perform polling for the Wi-Fi devices until a driving time of the timer is expired. When the driving time of the timer is expired, then the controller 820 controls the ZigBee communication unit 830 to transmit a ZB targeting the ZigBee devices.

Meanwhile, the controller 820 performs various operations according to an embodiment of the present disclosure, such as an operation for variably using the ZigBee communication period as illustrated in FIG. 7.

As described above, the Wi-Fi AP operates according to a frame structure including a period for the Wi-Fi communication and a period for the ZigBee communication so that the ZigBee devices and the Wi-Fi devices continuously perform the communication despite using the same frequency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of performing communication by a transmitter in a wireless communication system, the method comprising:

transmitting a first beacon signal for a first devices supporting a first communication scheme during a first beacon period;

determining a duration of a communication period for second devices supporting a second communication scheme according to a communication state of the second devices supporting the second communication scheme;

transmitting a second beacon signal for the second devices and information on the duration of the communication period to the second devices during a second beacon period immediately before the communication period; and transmitting a poll signal to a polled station from among the first devices during a poll period after the communication period, wherein the first beacon period, the second beacon period, the communication period, and the poll period are included in a frame allocated for the first communication scheme, wherein a frequency used for the first communication scheme is identical to a frequency used for the second communication scheme, and wherein a signal transmission operation of the first devices using the first communication scheme is suspended during the first beacon period and the communication period.

2. The method of claim 1, wherein the communication state of the second devices comprises at least one of whether an amount of data transmitted and/or received by the second devices is greater than or equal to a threshold value, and a number of data transmission and/or reception failures for the second devices.

3. The method of claim 1, wherein the information on the duration of the communication period is included in at least one of the second beacon signal for the second devices and system information for usage of the second communication scheme.

4. The method of claim 3, wherein the communication period comprises both a contention access period, in which at least one of the second devices transmits a response signal for the second beacon signal, and a contention-free period, in which at least one of the second devices performs communication according to a selection of the transmitter.

5. The method of claim 1, wherein the second devices are in an inactive state in which communication is not performed, between the communication period and a next second beacon period.

6. The method of claim 1,
wherein the duration of the communication period is periodically changed according to the communication state, and
wherein a signal reception operation of the first devices is performed during the first beacon period and the communication period.

7. A method of performing communication by a receiver in a wireless communication system, the method comprising:
performing communication by using a first communication scheme;
receiving, from a transmitter, a beacon signal for the first communication scheme and information on a duration of a communication period determined according to a communication state of first devices supporting the first communication scheme during a beacon period for the first communication scheme; and
performing communication by using the first communication scheme during the communication period according to the received information,
wherein the beacon period and the communication period are included in a frame allocated for a second communication scheme that is different from the first communication scheme,
wherein a frequency used for the first communication scheme is identical to a frequency used for the second communication scheme, and
wherein a signal transmission operation of second devices using the second communication scheme is suspended during the beacon period and the communication period.

8. The method of claim 7, wherein the communication state is determined according to at least one of whether an amount of data transmitted and/or received by the receiver is greater than or equal to a threshold value, and a number of data transmission and/or reception failures for the receiver.

9. The method of claim 7, wherein the information on the duration of the communication period is included in at least one of the beacon signal for the first devices supporting the first communication scheme and system information for usage of the first communication scheme.

10. The method of claim 9,
wherein the communication period comprises both a contention access period, in which at least one of the first devices transmits a response signal for the beacon signal, and a contention-free period, in which at least one of the first devices performs communication according to a selection of the transmitter.

11. The method of claim 7, wherein the receiver is in an inactive state in which communication is not performed, after the communication period and before a next beacon period.

12. The method of claim 7,
wherein the duration of the communication period is periodically changed according to the communication state, and
wherein a signal reception operation of the second devices is performed during the beacon period and the communication period.

13. A transmitter in a wireless communication system, the transmitter comprising:
a communication unit configured:
to transmit a first beacon signal for a first devices supporting a first communication scheme during a first beacon period,
to transmit a second beacon signal for second devices supporting a second communication scheme and information on duration of a communication period to the second devices during a second beacon period immediately before the communication period, and
to transmit a poll signal to a polled station from among the first devices during a poll period after the communication period; and
a controller configured to determine the duration of the communication period according to a communication state of the second devices,
wherein the first beacon period, the second beacon period, the communication period, and the poll period are included in a frame allocated for the first communication scheme,
wherein a frequency used for the first communication scheme is identical to a frequency used for the second communication scheme, and
wherein a signal transmission operation of the first devices using the first communication scheme is suspended during the first beacon period and the communication period.

14. The transmitter of claim 13, wherein the communication state is determined according to at least one of whether an amount of data transmitted and/or received by the second devices is greater than or equal to a threshold value, and a number of data transmission and/or reception failures for the second devices.

15. The transmitter of claim 13, wherein the information on the duration of the communication period is included in at least one of the second beacon signal for the second devices and system information for usage of the second communication scheme.

16. The transmitter of claim 15,
wherein the communication period comprises both a contention access period, in which at least one of the second devices transmits a response signal for the second beacon signal, and a contention-free period, in which at least one of the second devices performs communication according to a selection of the transmitter.

17. The transmitter of claim 13, wherein the second devices are in an inactive state in which communication is not performed, between the communication period and a next second beacon period.

18. The transmitter of claim 13,
wherein the duration of the communication period is periodically changed according to the communication state, and
wherein a signal reception operation of the first devices is performed during the first beacon period and the communication period.

19. A receiver in a wireless communication system, the receiver comprising:
a communication unit configured:
to perform communication by using a first communication scheme, and
to receive, from a transmitter, a beacon signal for the first communication scheme and information on a duration of a communication period determined according to a communication state of first devices supporting the first communication scheme during a beacon period for the first communication scheme; and
a controller configured to perform communication by using the first communication scheme during the communication period according to the received information, wherein the beacon period and the communication period are included in a frame allocated for a second communication scheme that is different from the first communication scheme, wherein a frequency used for the first communication scheme is identical to a frequency used for the second communication scheme, and wherein a signal transmission operation of second devices using the second communication scheme is suspended during the beacon period and the communication period.

20. The receiver of claim 19, wherein the communication state is determined according to at least one of whether an amount of data transmitted and/or received by the receiver is greater than or equal to a threshold value, and a number of data transmission and/or reception failures for the receiver.

21. The receiver of claim 19, wherein the information on the duration of the communication period is included in at least one of the beacon signal for the first devices supporting the first communication scheme and system information for usage of the first communication scheme.

22. The receiver of claim 21, wherein the communication period comprises both a contention access period, in which at least one of the first devices transmits a response signal for the first beacon signal, and a contention-free period, in which at least one of the first devices performs communication according to a selection of the transmitter.

23. The receiver of claim 19, wherein the receiver is in an inactive state in which communication is not performed, after the communication period and before a next beacon period.

24. The receiver of claim 19, wherein the duration of the communication period is periodically changed according to the communication state, and wherein a signal reception operation of the second devices is performed during the beacon period and the communication period.

* * * * *